United States Patent [19]

Anderl et al.

[11] 4,052,590
[45] Oct. 4, 1977

[54] ELECTRIC APPLIANCE WITH INTERMITTENTLY STAKED SHEATHED HEATING ELEMENT

[75] Inventors: Richard F. Anderl, Chippewa Falls; Lawrence J. Tienor, Eau Claire, both of Wis.

[73] Assignee: National Presto Industries, Inc., Eau Claire, Wis.

[21] Appl. No.: 736,449

[22] Filed: Oct. 28, 1976

[51] Int. Cl.² .............................. F27D 11/02
[52] U.S. Cl. .................... 219/438; 165/171; 219/439; 219/457; 219/530; 219/535
[58] Field of Search ............. 219/430, 438, 439, 441, 219/442, 457, 524, 530, 535, 540; 29/613, 615, 157.3 R, 157.3 C; 165/168, 171, 183; 99/447; 425/408

[56] References Cited

U.S. PATENT DOCUMENTS

| | | | |
|---|---|---|---|
| 1,729,673 | 10/1929 | Kercher et al. | 219/457 |
| 2,826,670 | 3/1958 | Keefe, Jr. | 219/438 X |
| 2,875,312 | 2/1959 | Norton | 219/535 |
| 2,944,138 | 7/1960 | Goff | 165/183 X |
| 3,110,796 | 11/1963 | Bremer | 219/457 |
| 3,275,801 | 9/1966 | Churchill | 219/540 |
| 3,372,473 | 3/1968 | Price | 219/438 X |
| 3,389,459 | 6/1968 | Russell | 29/615 |
| 3,448,798 | 6/1969 | Coe | 165/168 |
| 3,739,147 | 6/1973 | Mayhew et al. | 219/535 |
| 3,963,898 | 6/1976 | Tuckwell | 219/524 |

Primary Examiner—Volodymyr Y. Mayewsky
Attorney, Agent, or Firm—Johnson, Dienner, Emrich & Wagner

[57] ABSTRACT

The underside of the bottom wall of an electric cooker contains a sheathed electric heater element intermittently staked and keyed to the sides and base of a receiving channel to control and confine growth and resist twisting movement of the element therein during heating.

13 Claims, 10 Drawing Figures

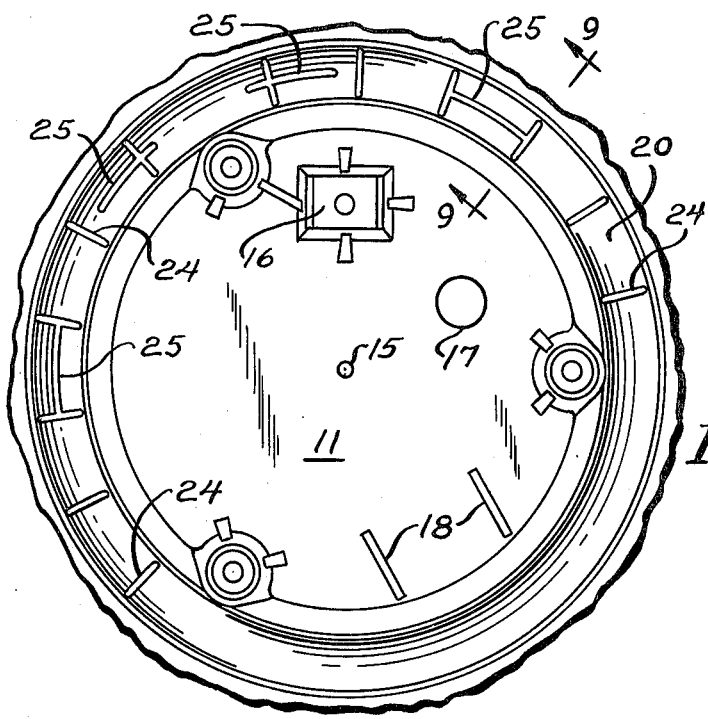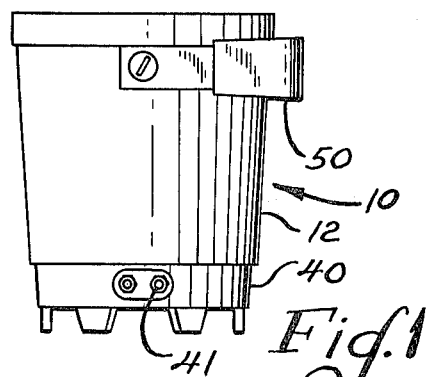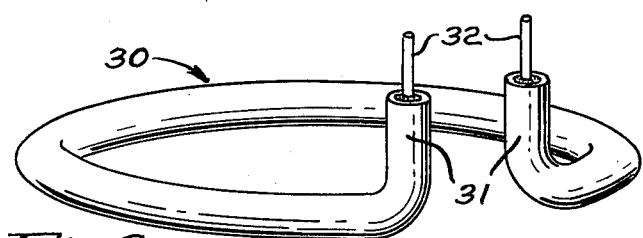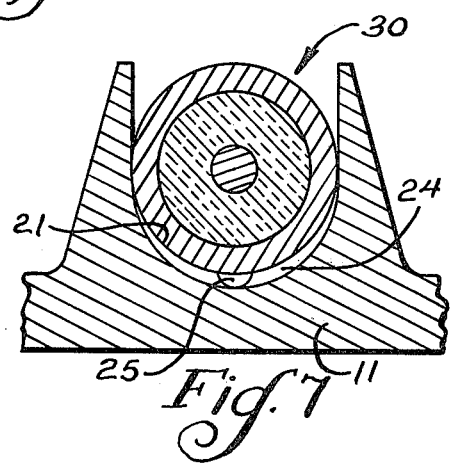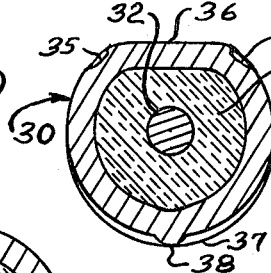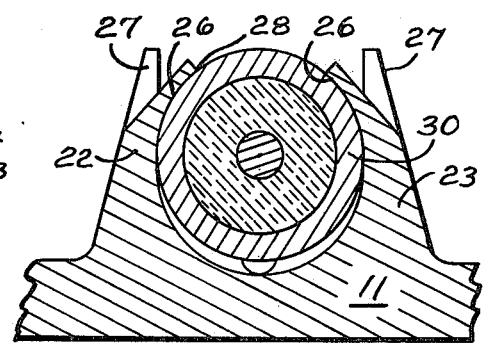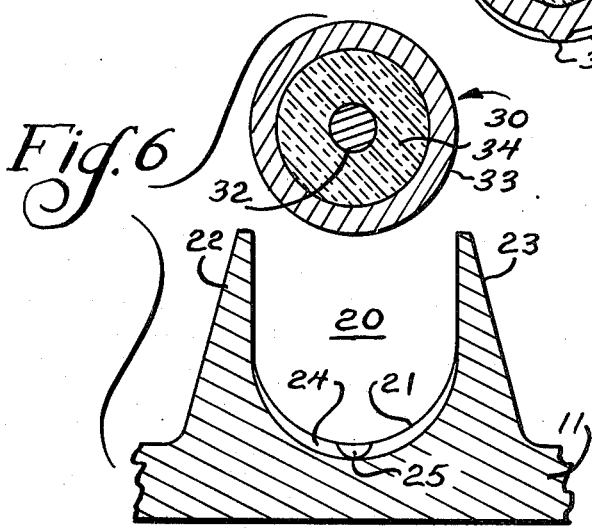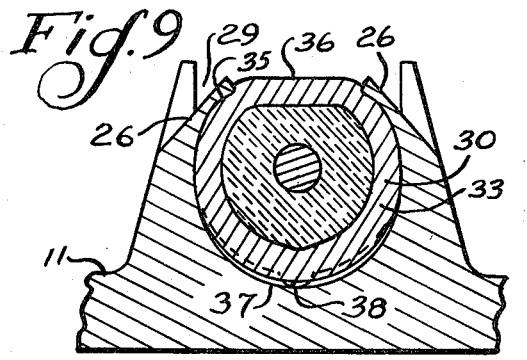

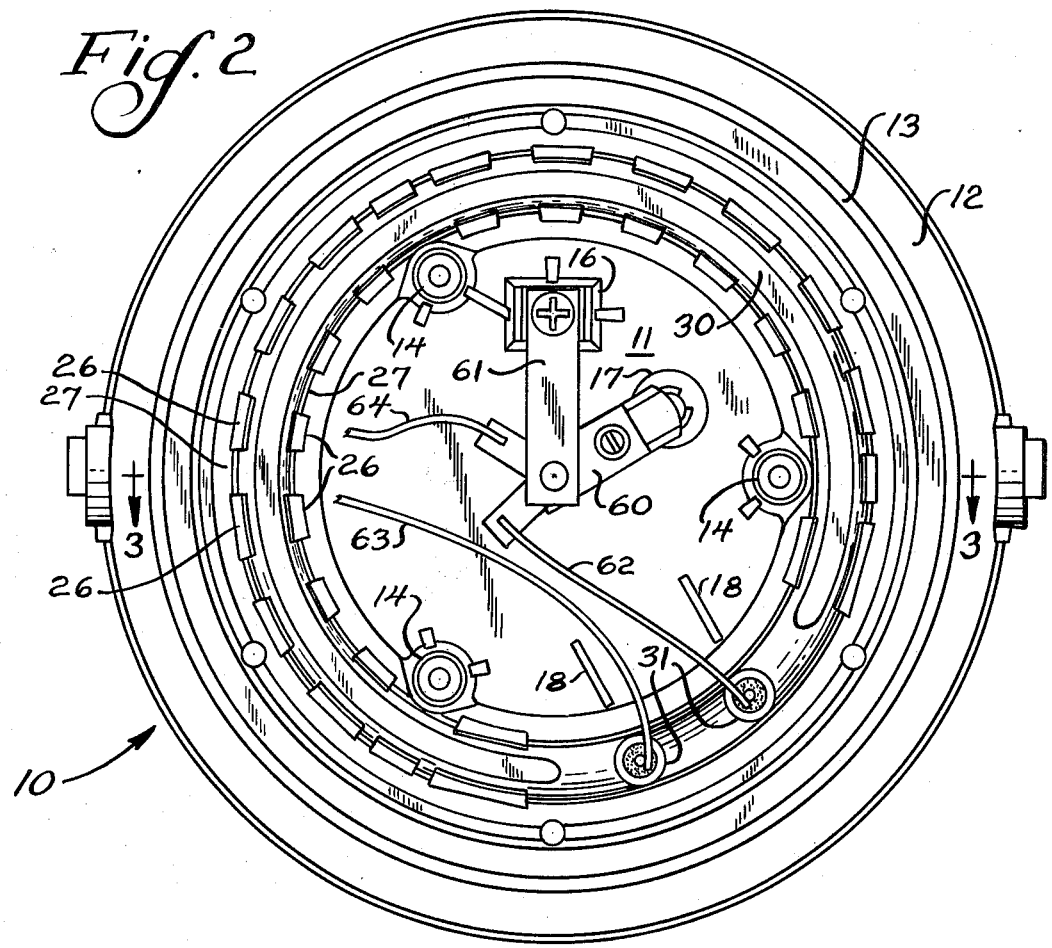

ELECTRIC APPLIANCE WITH INTERMITTENTLY STAKED SHEATHED HEATING ELEMENT

This invention relates to electric cookers or the like of the household or kitchen variety. More particularly, it relates to novel means and method of staking and keying a sheathed heater element within a provided channel on the underside of the cooker bottom wall.

Prior to the invention, it had been proposed, as an alternative to casting the element in place within the material of the cooker bottom wall, to secure a sheathed heater element to the cooker by brazing or welding the element to the underside of the cooker bottom wall or within a locating channel formed in said underside. Attempts also had been made to mechanically secure the heater element within the channel as by folding or displacing the outer edge of the opposed channel walls over the element to form a continuous stake along both sides of the heating element, and flattening the element to achieve an intimate thermal or heat transfer relation with the walls of the receiving channel as it is stacked therein. In Bremmer et al., U.S. Pat. No. 3,110,796, such a technique is disclosed as having utility when forming solid plate cooking units of an electric range. In our assignee's Tuckwell U.S. Pat. No. 3,963,898, the disclosed cooker has a sheathed heater element cast in place within a continuous depending rib of its upper cooking element so that the element is integral therewith. In a disclosed alternative thereto, the heater element is seated through the open top of a receiving channel against the base thereof and portions of the casting material on both sides of the channel are displaced to station the element with the channel and its lower side against the channel bottom.

We, however, have found that in mechanically staking a sheathed heater element to the underside of the cooker bottom wall, one of the problems to be faced is that the heater element may expand and contract at a different rate than does the metal casting to which it is staked. This is less of a problem in the case of conventional electric fry pans where the watt density of the heater element may be in the order of 45 or 50 watts per square inch of resistor surface and the heating of the fry pan metal proceeds only slowly. However, the problem becomes one of particular concern in the case of cookers where the watt density of the heating element has been increased, say to 94, so as to accelerate the heating cycle. Examples of such cookers are so-called deep fry cookers in which high watt density heating elements are utilized to rapidly heat the cooking oil to an elevated temperature in the order of 400° F. or higher and then to maintain the oil at said temperature through the cooking process.

Such cookers are commonly circular in shape and the receiving channel in which the sheathed heater element is confined is usually given a corresponding circular shape to maximize heat distribution. The assembly is completed after inserting the heater element by folding the opposed side edges of the channel over the heater element other than its terminal ends. The latter, of course, are turned out of the channel and into a more or less parallel spaced relation and adapted for attachment to terminal posts or a conductor. In such structure, the sheathed heater element is free to expand linearly as it heats up. Since the generated heat originates in the sheathed heater element and the casting derives its heat only by transfer from the heater element, the element heats up and expands at a rate more rapid than does the metal casting. As the element expands its growth initially is linear. However, as the element works in the channel, it starts to warp or twist upwardly and then against the overlying channel edges. With repetitive heating of the cooker, the element not only loosens itself within the channel but eventually also forces itself out of the confining channel and loses its surface to surface contact with the metal of the casting. Hot spots develop on the heating element and the element burns out. Even in the case of non-circular or rectangular-shaped heater elements, expansion of the element can occur in the straight portions of the channels between the corners and the same problem will exist--the element growing first linearly, then rotating, rising and burning out prematurely.

Where the heater element and its receiving channel are circular in shape, the problem is further complicated because inherent in the assembly is the fact that the outside stake necessarily has a larger diameter than does the inside stake. This means that the material of the outside stake has to compress or shrink to form a clamp with the folded inside stake. Because of variances in casting density, cracking of the outside stake material occurs; the element stake is weakened and, after a period of use, fails to properly confine the element.

Thus a first and principal object of the invention is to provide new and improved means and method of mechanically staking a sheathed heating element within its receiving channel on the underside of the cooker bottom which will control and/or confine said linear growth and expansion of the heater element so as to overcome the aforesaid problems and prevent premature burn out of the element.

A second and companion object of the present invention is to provide novel means of keying or locking the sheathed heater element within its receiving channel which will control or confine its lineal growth and torsional movement within the receiving channel of the cooker.

A further object is to provide a method of staking a heater element within a circular receiving channel which will minimize linear growth and twisting of the heating element and loss of metal-to-metal contact during heating to assure continued effective transfer of heat to the cooker bottom wall during energization of the heating element.

A companion object of the invention is to provide means and method of staking a sheathed heater element within its receiving channel on the underside of the cooker bottom wall which will maximize its useful life.

In accordance with this invention, the sheathed heater element is shaped to the shape of the receiving channel and, when the element is positioned therein against the base of the channel, the projecting outer edges of the upstanding opposed walls of the receiving channel are sheared along their length into short segments; and alternate segments are pressed inwardy over and into the material of the sheathed heater element to clamp the element within the channel. Thereafter, or simultaneously with said pressing, the exposed side of the element is also flattened along its length to closely conform and thereby be urged into an intimate thermal and effective heat transfer relation with the surrounding surface of the channel cooker wall. Sufficient pressure is applied that the material of the sheathed heater element is forced outwardly and expands into the gaps between the inwardly pressed segments or stakes, thereby enforcing penetration or indentation of the sheared and pressed edge segments into the material of the heater element sheath.

The invention further contemplates that the base of the channel will be provided with radial transverse or extending narrow grooves and also longitudinal grooves into which the material of the element sheath is forced.

Thus, a feature of the invention is that the opposed channel walls are intermittently staked to the element and key-locks are created about the element at short regular intervals which allow the element to expand only in the areas between the intermittent stakes. The total growth of the element is no longer transferred only to one point on the element but is divided between the stakes. Where the receiving channel is circular in shape, such intermittent staking also allows room for the compressed material of the staked segments on the outside of the receiving channel to flow.

A further feature of the invention is that not only is the outer edge of each wall of the channel intermittently indented into the material of the heater element, but the individual stakes are located opposite the staked segments of the opposite wall, creating mechanical clamps for retaining the element in the channel.

A further feature of the invention is that the transversely extending grooves in the base of the channel are spaced at regular intervals and beneath the pairs of indented segments of the channel walls which stake the element in the channel.

Still another feature of the invention is that both the radial and longitudinally extending grooves in the channnel bases are located in the areas of the channel where the heat generated by the heater element is concentrated.

Many other objects, advantages and features of the invention will be at once apparent or will become so, upon consideration of the presently preferred embodiment of the invention which now will be described in connection with the figures of the accompanying drawing.

Referring thereto to the drawings:

FIG. 1 illustrates a deep fry cooker having a sheathed electric heater element intermittently staked within a receiving channel on the underside of its bottom wall in accordance with this invention;

FIG. 2 is a plan view of the underside of the cooker bottom wall, the enclosing base of the cooker having been removed;

FIG. 3 is a section view taken along line 3—3 of FIG. 2 looking in the direction indicated by the arrows;

FIG. 4 is a fragmented plan view of the bottom wall of the cooker shown in FIG. 2, but on a smaller scale, the thermostat and the sheathed heater element having been removed to more clearly illustrate the disposition and arrangement of the transversely extending and longitudinally extending grooves formed in the base of the channel;

FIG. 5 is a perspective view of the heater element ready to be placed within the channel;

FIGS. 6, 7, 8 and 9 are cross sections of the heater element and receiving channel on the underside of the cooker bottom wall, the several views illustrating in sequence the assembling of a sheathed heater element within the receiving channel of the illustrated electric cooker bottom wall and staking it therein in accordance with the invention, the views being considered as taken along line x—x of FIG. 4 looking in the direction indicated by the arrows; and FIG. 10 is a sectional view taken through the heater element and illustrate the indentation and radial and longitudinal ribs formed therein to lock the heater element to the channel.

Referring now more specifically to the several views wherein like parts are identified by like reference numerals, and first to FIGS. 1 - 3, at 10 is illustrated an exemplary electric cooker having a circular-extending continuous channel 20 formed on the underside of its bottom wall 11 in which a sheathed electric heater element 30 is intermittently staked and keyed thereto in accordance with the invention as hereinafter described. The body of the illustrated cooker 10 comprises an aluminum casting having an upstanding continuous wall 12 which forms with said circular flat bottom wall 11, a relatively deep well into which food is placed for cooking. Depending from said bottom wall 11 is an integral shroud 13 within which is assembled a generally cup-shaped footed base 40 of heat insulating material such as phenolic resin on which the asssembled cooker stands. Base 40 is removably connected to integral mounting bosses 14 on said bottom wall by screws or the like not shown. For convenience in manipulation, cooker 10 is also provided with a hingedly connected handle 50 of suitable construction.

As shown best in FIGS. 3 and 4, bottom wall 11 of the cooker 10 includes a centrally disposed depending integral stud 15 integral therewith on which is assembled a thermostatic switch illustrated generally at 60. Said bottom wall also has an integral projecting portion 16 to which is fastened a leaf spring member 61 having engagement with switch 60. At 17, bottom wall 11 has a circular recessed area providing clearance for operation of the thermostatic switch 60 and at 18 has raised indicia with which the upturned ends 31 of the sheathed heater element 30 are aligned when the heater element is correctly located in channel 20.

Heater element 30 is of conventional construction and, as shown in FIG. 5 and 6, embodies a resistance element 32 of high watt density, the opposed ends of which project outwardly from the ends of an enclosing sheath 33 of ductile aluminum metal, the same being packed about element 32 with suitable dielectric material 34 such as magnesium oxide. Heater element 30 is initially of circular cross section (FIG. 6) and pre-shaped to a circular form (FIG. 5) of appropriate diameter for insertion within channel 20 and against its arcuate shape base 21. As illustrated in FIG. 2, conductor 62 connects one projecting end of resistance element 32 to one side of the thermostatic switch 60, and conductor 63 connects the other end of resistance element 32 to one of the two terminal posts 41 affixed in the cooker base 40 (FIG. 1). The other terminal post is connected by a third connector 64 to the other side of the thermostatic switch 60.

As thus far described, cooker 10 is of conventional construction. Its cooking well being relatively tall in comparison to its cross section. It is particularly useful for deep frying various foods such as chicken, donuts, fish, egg rolls, french fried potatoes, fruit fritters, french fried cheese and the like in a suitably-heated vegetable shortening or cooking oil. As an example, in one commercial embodiment of the illustrated cooker, its cooking well has an inside diameter of approximately 5.2 inches at its bottom wall, a top inside diameter of about 6 inches and an inside height of about 4.75 inches. A cooker of such dimensions is deemed adequate for deep frying one to two cups of food in two cups of cooking oil and for this purpose its thermostat 60 is preset to maintain a temperature cycle within the range of about 385 to 415° F. In the exemplary cooker, its channel 20 and heater element 30 staked therein have an average diameter of 3.84 inches and a cross section of about 5/16 inch. For rapid heating of the cooking oil to the indicated deep frying temperature and maintenance thereof at said temperature, the selected heating element 30 has a high watt density in the order of 94 watts per square inch of resistor area which is, perhaps, double that of heating elements conventionally provided in electric fry pan. As aforedescribed when such a heating element is staked according to conventional methods, as by a continuous staking along the two sides of the channel, the heating element is wont to grow and twist within the channel. With said warping, the element soon separates itself from the channel and loses its metal-to-metal contact. Burn-out and shortened life as discussed above follows.

In accordance with this invention, novel means and method of staking the heater element 30 within channel 20 are employed so that the element is keyed at short regular intervals to the channel means which serve both to hold the sheath of the heater element in metal-to-metal contact with the base and sides of the receiving channel and in a manner to divide its linear growth within the channel as it expands and contracts during the heating cycle so that it is not concentrated in one area with consequent warp and separation from the channel.

As illustrated best in FIG. 7, base 21 of the receiving channel 20 has an arcuate cross section shape which corresponds to the circular cross-sectional shape of the heating element 30 and merges into the upstanding inner sides of its concentric inner sidewall 22 and outer sidewall 23. In the illustrated cooker, said walls 22 ad 23 project outwardly of the thickness of the cooker bottom wall, are generally wedgeshape in section and have an inside height approximately equal to the diameter of the heating element 30 positioned therein.

Considering now FIG. 6 with FIG. 4, it will be seen that in casting the cooker body a plurality of regularly spaced narrow grooves are formed in the base 21 of the heater element receiving channel 20. Several of these identified at 24 extend radially of the cooker wall, i.e. transversely of the channel 20, the full channel width and merge into the inner surface of the upstanding channel walls 22, 23. Other of these grooves identified at 25 extend longitudinally of the channel. As shown in FIG. 4, transverse or radial grooves 24 are equally spaced throughout the length of the channel other than in the portion occupied by the upturned ends 31 of the heater element 30, such representing perhaps two-thirds the extend of channel 20. On the other hand, the longitudinally extending grooves 25 are shown located in the half of the channel length most remote from indicia 18 where the greatest concentration of heat would be expected and therefore the area in which the heater element would be expected to warp.

Considering next FIGS. 2 and 8, heater element 30 is shown staked within the channel 20 by oppositely disposed, spaced segments 26 of the outer edge of the inner and outer channel walls 22, 23 which have been radially sheared and pressed inwardly of the channel 20 over the heater element. Intervening segments 27 of said outer edge between said inwardly pressed segments retain their initially formed upstanding relation. Conveniently, said shearing and inward pressing of segments 26 can be accomplished as a single act although if preferred, it can be done sequentially. Advantageously also, ends 28 of the inwardly pressed edge segment 26 are cut at sharp angles and sufficient pressure is applied that said ends will enter and displace the material of the heater sheath, forming a confining indent 35 therein (FIG. 10). Thereafter, or simultaneously therewith, the exposed side 36 of the heater element is also pressed along its length to the illustrated flattened shape. As illustrated by FIG. 2, said flattened side extends from immediately adjacent the two upturned ends 31 of the heater element. Sufficient pressure is applied to cause the heater element 30 and particularly its sheath 33 to conform to and intimately engage the inner surface of the channel including its base and upstanding walls in order to establish an effective heat transfer relation therebetween through an intimate metal-to-metal contact. In said flattening of the heater element, the pressure applied is sufficient that material of the sheath is forced into the transverse grooves 24 and longitudinal grooves 25 in the channel base 21 and also into the gaps 29 which exist between the inwardly pressed segments 26. The resultant ribs 36 formed on the underside of the heater element project into the transverse grooves 24 and constitute keys which in cooperation with the ends 29 of segments 24 indented into the heating element lock the heater element against movement lengthwise of the channel 20. Ribs 37 which are simultaneously pressed into the longitudinal grooves 25 of the channel base 21 form keys which resist rotation, twisting or warping of the heater element. The material of the heater element sheath forced into the gap 29 and to opposed sides of the staked segments 26 effectively deepens the indent 35 or penetration of their inwardly pressed ends 29 into the sheath material.

The effectiveness of the described keying of the heater element to the channel sides including its base is maximized when the inwardly pressed segments 26 of the channel walls 22, 23 are paired, that is are located directly opposite to each other, and overlie the transverse grooves 24 and ribs 37 formed therein. As shown in FIG. 2, the inwardly pressed segments 26 of the outer channel 23 may be of greater circumferential or longitudinal extent than are the inwardly pressed segments 26 paired therewith. Preferably also, segments 26 will have a greater extent than will the intervening segments 27 which are left upstanding.

It will be further appreciated that the acts of shearing and pressing the segments 26 of the channel walls may be accomplished sequentially or simultaneously with the flattening of the exposed side 36 of the heater element, and that in either procedure, said acts of shearing and pressing alternate segments of the outer edge of the channels and flattening the heating element constitute highly practical means and method whereby the heater element may be confined within the receiving channel and in continuous effective heat transfer relation therewith.

Thus, it will be appreciated that all the recited objects, advantages, and features of the invention have been demonstrated as obtainable in a highly practical economical manner.

Having described the invention, what is claimed is:

1. An electrically heated appliance having a heat-conductive metal wall containing a channel and a sheathed electric heater element intermittently staked in said channel, the sheath of said electric heater element having longitudinally spaced indentations in the material of its outer side into which correspondingly spaced segments of the outer edge of the opposed channel sides are pressed, intervening portions of said outer edges between said pressed segments being out of engagement with the heater element sheath, the material of the heater element sheath between said indentations closely engaging about and conforming to the side edges of said pressed segments thereby confining linear growth of the sheathed heater element in the channel during heating.

2. An electrically-heated appliance having a heat conductive metal wall containing a channel and a sheathed electric heater element in said channel, spaced segments of the outer edge of the opposed channel sides along the length of the heater element being indented into the sheath of the heater element and intervening portions of said outer edges between said indented segments being out of engagement with the heater element sheath, the underside of the sheathed heater element having surface to surface contact with the base of the channel, and the channel base having spaced narrow grooves into which material of the heater element sheath is keyed.

3. An electrically-heated appliance as claimed in claim 2 wherein some of said grooves extend laterally of the channel.

4. An electrically-heated cooker having a heat conductive metal bottom wall containing a channel and a sheathed electric heater element seated in said channel with its underside in surface to surface contact with the channel, said heater element and channel having spaced pairs of interlocked projecting and receiving portions, and the outer side of the sheathed heater element being flattened along its length such that the heater element is keyed at spaced intervals along the length thereof by said projecting and receiving portions so as to confine growth of the heater element during heating.

5. An electrically heated cooker having a heat conductive metal bottom wall containing a channel and a sheathed electric heater element seated in said channel with its underside in surface to surface contact with the channel, said heater element and channel having spaced interlocked portions which confine linear growth of the heater element during heating, said interlocked portions comprising oppositely disposed segments of the channel outer edges indented into the material of the sheath of the heater element, the outer surface of the sheathed heater element being flattened along its length, and material of the sheathed heater element between the indented segments being forced outwardly and about said indented segments.

6. An electrically heated cooker having a heat conductive metal wall containing a channel and a sheathed electric heater element seated in said channel with its underside in surface to surface contact with the channel, said heater element and channel having spaced interlocked portions which confine growth of the heater element during heating, wherein said interlocked portions comprise oppositely disposed segments of the channel outer edges intended into the sheath of the heater element and also include narrow grooves in the channel base into which are received ribs on the underside of the heater element sheath.

7. An electrically heated cooker as claimed in claim 6 wherein the narrow grooves and received ribs extend laterally of the channel and heater element.

8. An electrically heated cooker as claimed in claim 6 wherein some of the narrow grooves and received ribs extend laterally of the channel and heater element, and others thereof extend longitudinally of the channel and heater element.

9. An electrically heated cooker having a bottom wall of heat conductive meatal with projecting inner and outer spaced walls which define a channel therebetween and a sheathed electric heater element seated in said channel and its terminal ends extending outwardly therefrom, oppositely disposed spaced segments of said inner and outer channel walls having their outer ends intended into the material of the sheath of the heater element and intervening segments of said outer edges of the channel walls being out of engagement with the heater element, the outer side of the sheathed heater element being flattened along its length, the sheath material on either side of the intended ends of said segments closely engaging about the side edges of the intended ends of said spaced segments, and the inner side of the sheathed heater element having close contact with the base of the channel.

10. An electrically heated cooker having a bottom wall of heat conductive metal with projecting inner and outer spaced walls which define a channel therebetween, and a sheathed electric heater element seated in said channel with its terminal ends extending outwardly therefrom, oppositely disposed spaced segments of said inner and outer channel walls having their outer ends indented into the sheath of the heater element and intervening segments of said outer edges of the channel wall being out of engagement with the heater element, the outer side of the sheathed heater element being flattened along its length and the underside of the sheathed heater element having close contact with the base of the channel, said underside of the sheathed heater element having spaced lateral extending ribs which extend into receiving narrow grooves in the channel base.

11. An electrically heated cooker as claimed in claim 10 wherein said laterally extending ribs and narrow grooves are aligned with the indented ends of the outer edge segments of the channel walls.

12. An electrically heated cooker as claimed in claim 10 wherein the channel base has longitudinally extending narrows grooves into which project longitudinal extending rib like portions of the sheathed heater element underside.

13. An electrically heated cooker as claimed in claim 12 wherein said longitudinally extending grooves in the channel bases are remote from the location of the outwardly extending terminal ends of the heater element.

* * * * *

UNITED STATES PATENT OFFICE
CERTIFICATE OF CORRECTION

PATENT NO. : 4,052,590
DATED : October 4, 1977
INVENTOR(S) : Richard F. Anderl, Lawrence J. Tienor It is certified that error appears in the above-identified patent and that said Letters Patent are hereby corrected as shown below:

Column 1, line 23 Change "stacked" to --staked--
Column 3, line 34 Change "bases" to --base--
Column 4, line 33 After "having" insert --bearing--
Column 5, line 34 Change "section" to --sectional--; line 56 "extend" change to --extent--
Column 6, line 45 After "channel" insert --wall--
Column 7, line 26 & 27 After "extend" and before "laterally" insert --longitudinally of the channel and other of said grooves extend--
Column 8, line 10 Change "meatal" to --metal--; line 17 Change "and" to --with--; line 20 Change "intended" to --indented--; line 26 Change "intended" to --indented line 28 Change "tended" to --dented--; line 53 Change "narrows" to --narrow--.

Signed and Sealed this

Fourteenth Day of February 1978

[SEAL]

Attest:

RUTH C. MASON
Attesting Officer

LUTRELLE F. PARKER
Acting Commissioner of Patents and Trademarks

Disclaimer 4,052,590.—*Richard F. Anderl*, Chippewa Falls, and *Lawrence J. Tienor*, Eau Claire, Wis. ELECTRIC APPLIANCE WITH INTERMITTENTLY STAKED SHEATHED HEATING ELEMENT. Patent dated Oct. 4, 1977. Disclaimer filed Mar. 20, 1978, by the assignee, *National Presto Industries, Inc.*

Hereby enters this disclaimer to claim 4 of said patent.

[*Official Gazette October 3, 1978.*]